Feb. 11, 1941.　　　E. F. RIESING ET AL　　　2,231,346
SEAT CONSTRUCTION
Filed June 23, 1938　　　3 Sheets-Sheet 1

INVENTORS
Ellwood F. Riesing
Alan E. Rathbun
Gilbert V. Soper
BY
Ely & Frye
ATTORNEYS

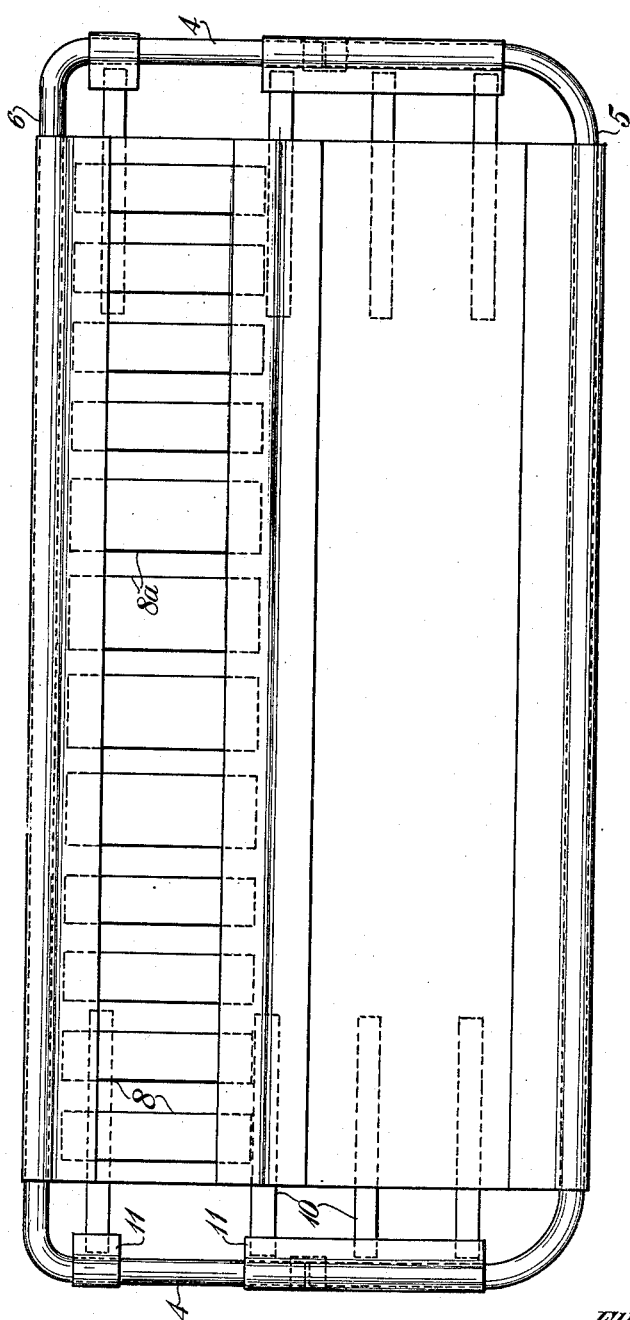

Feb. 11, 1941.　　E. F. RIESING ET AL　　2,231,346
SEAT CONSTRUCTION
Filed June 23, 1938　　3 Sheets-Sheet 3
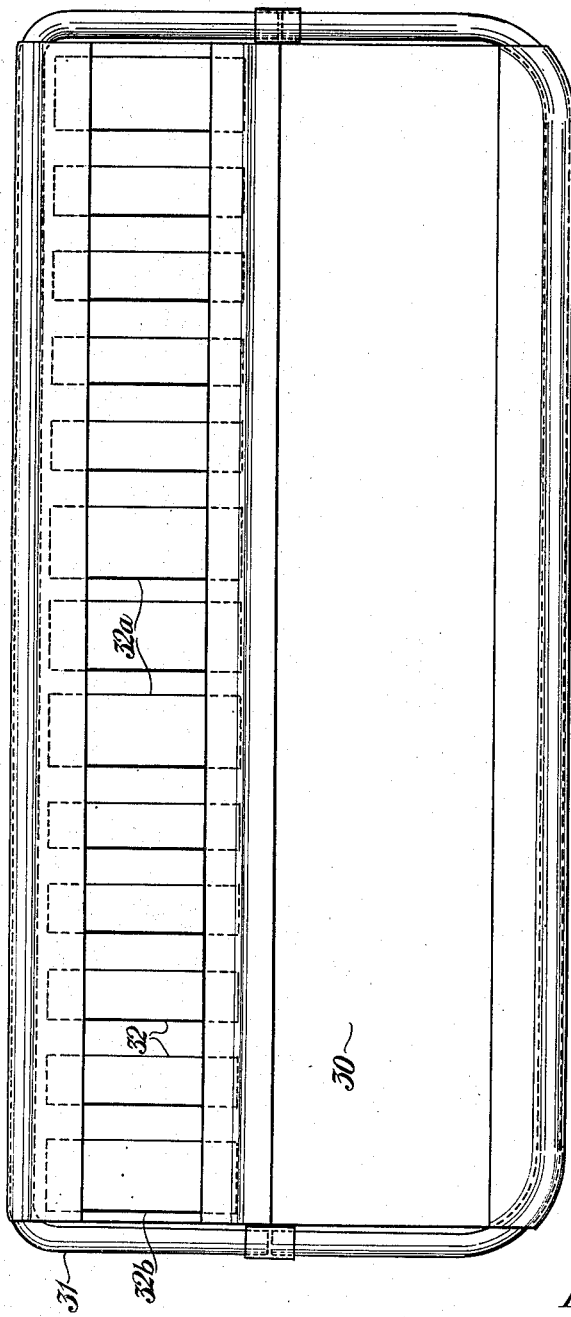
INVENTORS
Ellwood F. Riesing
Alan E. Rathbun
Gilbert V. Soper
BY Ely & Frye
ATTORNEYS Patented Feb. 11, 1941

2,231,346

UNITED STATES PATENT OFFICE 2,231,346

SEAT CONSTRUCTION

Ellwood F. Riesing, Alan E. Rathbun, and Gilbert V. Soper, Akron, Ohio, assignors to The Firestone Tire & Rubber Company, Akron, Ohio, a corporation of Ohio Application June 23, 1938, Serial No. 215,376

10 Claims. (Cl. 155—179)

This invention relates to seats generally, and more especially to rubber seats and the supporting means therefor.

Heretofore the use of rubber in the construction of automobile seats, and the like, has been suggested for the resiliency of rubber well adapts it for general use as cushioning means. Rubber automobile cushions of approximately the same size as regular cushions have been produced, but they are not economical, due to their increased cost over regular constructions. Attempts to reduce the cost and the amount of rubber used in seat cushions have been made but have not been entirely satisfactory.

A general object of this invention is to overcome the foregoing, and other objections to known types of rubber cushions and to produce an all-rubber seat cushion and rubber-spring suspension for same, which can commercially compete with standard cushions and which supports load without excessive or undesirable deflection.

Another object of the invention is to provide apparatus for supporting persons in a comfortable, healthful manner.

The foregoing and other objects will appear from the following description.

The invention is practiced by reducing the volume of rubber in the cushion to approximately half the volume of a standard seat cushion and supporting the cushion by a resilient layer, or support. The support includes a plurality of rubber strips that permit deflection when loaded, although certain strips are built to offer more resistance to deflection than the others to prevent undesirable distortion of the support. Thus the resilient support for the cushion compensates for the reduction of volume in the rubber cushion by itself carrying a portion of the load. The base of a seat constructed in accordance with the invention is extended rearwardly with relation to the back of the seat to aid in supporting a person on the seat in a healthful position, as will hereinafter be completely described.

In the accompanying drawings:

Figure 2 is a plan view taken on line 2—2 of Figure 1, with the rubber cushion removed;

Figure 3:
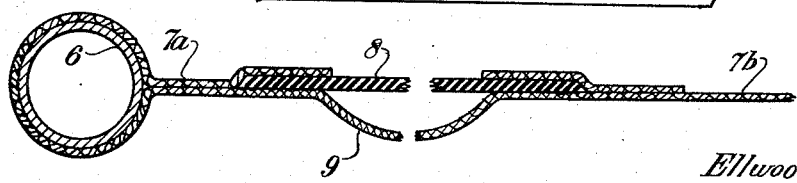

Figure 3 an enlarged section of the connection between the fabric sheet and the rubber strips; and Figure 4 a plan view, similar to Figure 2, of a second embodiment of the invention.

Referring more particularly to the accompanying drawings, a seat is shown which includes a back cushion 1 and a seat, or base, cushion 2, the cushions being similarly constructed. The base cushion 2 is supported by a quadrangular frame 3 that may be made from tubular material, as shown, and have sides 4, a front portion 5 and a rear portion 6. A supporting sheet or cushion support 7, which may be made from any suitable material, such as canvas, and which may be rubberized, if desired, is secured to and between the front portion 5 and to the rear portion 6 of the frame. The sheet is appreciably deeper than the frame 3 so that it is not held taut in the frame.

In order to give the sheet 7 resiliency and to stretch it between opposite sides of the frame 3, elastic means, such as a plurality of rubber strips 8, are secured at their ends to spaced portions of the sheet 7 by vulcanization, rivets, stitching or the like. These rubber strips 8, as seen in Figure 2, are adjacent the rear of the frame 3 and are positioned in the direction of from front to rear of the frame. Necessarily the rubber strips are of such composition as to give them the desired strength and prevent undue distortion thereof, under normal load.

Figure 3 discloses how the rubber strips 8 combine with a rear portion 7a and a front portion 7b of the sheet 7 to form a support which normally is in the plane of the frame 3. The rubber strips 8 are under tension and produce a slack, or looped portion 9 in the sheet 7 by tightening the rest of it in the frame. The loop 9 is made large enough in relation to the strength of the rubber strips 8 that normal loads will not distort the strips far enough to bear upon, or bottom against, the loop of the sheet 7. If the rubber strips break, the loop 9 serves as a safety, or auxiliary, connection between the opposite sides of the frame. In some cases, it may be desirable to form the sheet 7 in two separate pieces and dispense with the loop 9.

It should be observed that the strips 8 in the support permit it to deflect and adapt itself to the load contour. Rubber strips 8a which are wider than the remainder of the strips are placed at the center of the frame to offer greater resistance to the deflection at the center of the sheet and eliminate the "dishing" effect, or sidewise curvature tending to occur when load is applied at an area on one side of the center or at two areas one on each side of the center of the base cushion 2.

The sides of the sheet 7 are preferably supported by resilient means which comprise rubber strips 10, similar to the strips 8. These strips are secured in any suitable manner, such as vulcanization, to the sheet 7 and to small sections of fabric 11, such as canvas, that are secured to the sides 4 of the frame 3. Ordinarily the rubber strips 10 are only secured to the portions 7a and 7b of the sheet 7 to form a resilient side support therefor.

The remaining cushioning, or supporting means, of the base cushion 2 comprises a foam-rubber pad, or cushion, 12 which has a plurality of substantially square, regularly spaced cells 12a extending into it from the bottom thereof. The pad 12 is carried by the support formed of the strips 8 and the portions 7a and 7b of the sheet 7 and may be fixedly secured thereto, if desired. The frame 3 is supported by a base 13 that carries the frame through members 14. A seat cover 15 is secured to the base 13 and drawn snugly over the pad 12 to hold it in place and give a finished appearance to the seat.

Figure 1:
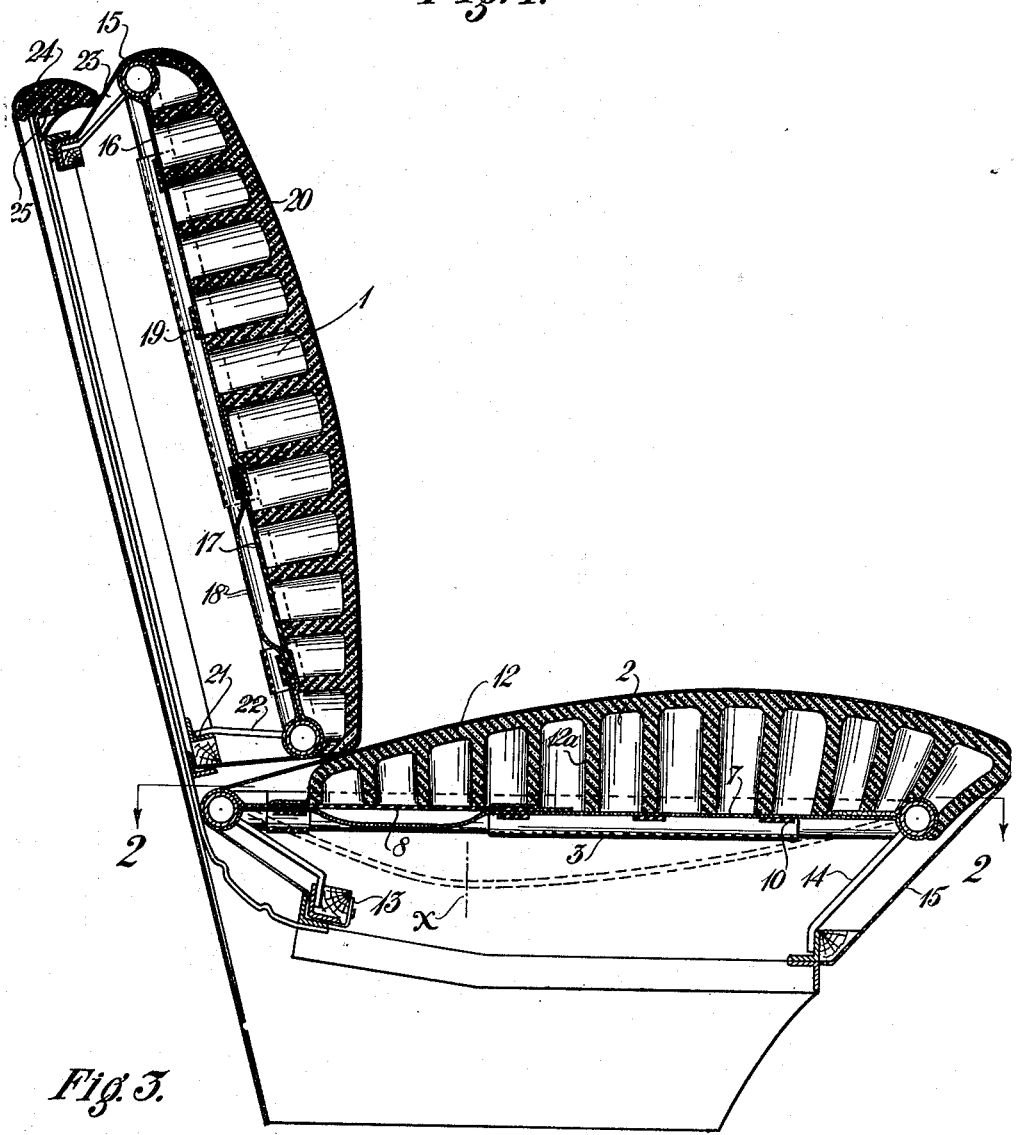
Figure 1 is a vertical cross-section through an embodiment of the invention, the position of the horizontal cushion under load being indicated in dotted lines.

Figure 1 shows that the back cushion 1 is similar to the seat cushion 2 and it comprises a frame 15 that has a fabric sheet 16 extending from top to bottom thereof. This sheet is made taut by rubber strips 16 which thereby produce a loop 18 in the sheet. When the back cushion 1 forms the back of the front seat of a vehicle, the loop 18 should be smaller than the loop shown so that it can bottom against the rubber strips under a fairly small load to provide a back support for the driver during brake application. Side strips 19 support the sides of the sheet 16 and a sponge-rubber pad, or cushion, 20 is carried by and preferably secured to the supporting layer formed by the rubber strips 17 and the sheet 16. A base 21 carries the frame 15 by members 22. A seat cover 23 aids in holding the pad 20 in place and completes the back cushion 1. In some instances, the cushions 12 and 20 may be made integrally, if desired.

A rubber head-rest 24 is also associated with the base 21 adjacent the top of the pad 20 and it is secured to a support 25 which is connected to the base.

It will be observed that the frame 3 extends an appreciable distance to the rear of the back cushion 1 and that this permits the row of rubber strips 8 to be placed immediately adjacent the base of the back cushion (Figure 1). A person sitting on the seat, applying a load having a center at the line X, is supported in a healthful and comfortable manner, for the deflection of the base cushion and cushion support, indicated by dotted lines, is distributed before and behind the pelvis of the supported person. The seat has little, or no tendency to produce a slouch in the person supported but actually acts to maintain the person's back against the entire height of the back cushion since the deflection of the base cushion occurs primarily in the row of rubber strips 8 which are adjacent the rear of the seat, in the area of the center of load application.

A feature of the invention is that an all-rubber cushion is made practical thereby. Furthermore, the cushion is supported so that center "dishing" is eliminated and the cushion adapts itself to the person sitting thereon to support him in a desirable manner.

It will be seen that the rubber strips do not bear upon each other, as in many prior constructions, for this substantially prevents proper movement and distortion of the strips under load. Then too, the construction prevents repeated vibrations after a change is made in the load carried thereby since only one row of elastic supporting means are provided and these are offset from the center of the seat.

Another example of the support of the invention is disclosed in Figure 4. Here a sheet 30 is secured between the front and rear arms of a frame 31. The sheet 30 is made to extend tautly between the frame by rubber strips 32 which form a loop in the sheet 30 as in the preferred practice of the invention. In this case, not only the center strips 32a, but also the end strips 32b are made to offer greater resistance to distortion than the remaining rubber strips. Thus the necessity for supporting the sides of the sheet 30 is removed and the construction of the seat is simplified.

It will be noted that in each embodiment of the invention a cushion or pad of foam-rubber is used that is substantially thinner or shallower than the combination of coil springs and curled hair or other upholstery material now in common use in the automobile industry.

The seat construction of the invention is adapted to deflect in proportion to the load applied and then to be distorted substantially only where load is applied so that spaced loads having pressure differentials distort the seat varying amounts.

The word "seat" in the accompanying specification and claims is used in its broadest sense and includes beds, lounges, and supports generally in its scope.

In accordance with the patent statutes, we have illustrated and described several embodiments of the invention. However, it will be understood that various modifications can be made without departing from the scope of the invention as defined in the appended claims.

We claim:

1. A seat comprising a back cushion, a quadrangular frame positioned below and projecting from the front and rear of said back cushion, a fabric sheet attached to said frame and providing a fabric center portion appreciably larger than said frame, a plurality of rubber strips secured at their ends to spaced points on said sheet and being positioned in a row which is adjacent the base of said back cushion, said rubber strips being normally shorter than the distance between the spaced points on said sheet to which they are secured and being stretched between said points to loop said sheet between said points, said rubber strips cooperating with said sheet to form a taut resilient support which normally is in the plane of said frame, the loops in said sheet serving as a safety connection and a stretch limiting means for extreme loads and being of such size that they do not limit the distortion of the support under normal load, and a porous rubber cushion carried by said support, said rubber strips being positioned at the portion of said support normally carrying the greatest load when a person sits upon the seat with substantially all of his back against said back cushion whereby said rubber strips deflect and aid in maintaining the majority of the load adjacent the base of said back cushion.

2. A seat comprising a back cushion, a frame positioned below and projecting from the front and rear of said back cushion, a fabric sheet attached to said frame and providing a fabric center portion appreciably larger than said frame, and a plurality of rubber strips secured to spaced points on said sheet and being positioned in a row which is adjacent the base of said back cushion, said rubber strips being stretched between said points to cooperate with said sheet to form a taut resilient support which normally is in the plane of said frame, said rubber strips being positioned at the portion of said support normally carrying the greatest load when a person sits upon the seat in a healthful manner with his back against said back cushion whereby said rubber strips deflect and aid in maintaining the person with the greatest portion of his weight adjacent the base of said back cushion.

3. A seat comprising a back cushion, a frame having front and rear portions positioned below and projecting from the front and rear of said back cushion, a fabric sheet loosely secured between the front and rear portions of said frame, and a plurality of rubber strips secured to spaced portions of said sheet to tighten it in said frame and form a loop of fabric around said strips, said strips being positioned in a row which extends across a dimension of said sheet and which is adjacent the base of said back cushion, said sheet and said rubber strips combining to form a support in said frame whereby a person sitting upon said support normally applies most weight to the portion thereof formed by said rubber strips which deflect under load to adapt themselves thereto.

4. A seat comprising a back cushion, a frame positioned below and projecting from said back cushion, a fabric sheet loosely secured between portions of said frame, and a plurality of rubber strips secured to spaced portions of said sheet to tighten it in said frame and form a safety loop of fabric around said strips, said strips being positioned in a row which is immediately adjacent the base of said back cushion.

5. A seat support comprising a quadrangular frame, means for supporting said frame, a fabric sheet secured to the front and rear portions of said frame and being appreciably longer than the distance therebetween to provide a fabric center portion appreciably larger than said frame, a plurality of rubber strips secured to said sheet to stretch it tautly between said frame and to form a support therewith, said rubber strips producing a loop in said sheet which forms a safety connection between said frame, said rubber strips being more resistant to deflection at the center of said sheet than at the remainder thereof to eliminate center sag in the seat and being positioned in a row adjacent the rear of said frame, a rubber cushion carried by said support and means securing said cushion on said support.

6. In a seat construction, a frame having a front and a rear portion, a sheet secured between the front and the rear of said frame, said sheet being longer than the distance between these portions of said frame, and a plurality of rubber strips secured to said sheet and forming a support therewith, said rubber strips being more resistant to deflection at the ends and center of said frame than at the other portions thereof to eliminate excessive end and center deflection of the support by load.

7. In a seat construction, a frame having a front and a rear portion, a sheet secured between the front and the rear of said frame, said sheet being longer than the distance between these portions of said frame, and a plurality of rubber strips secured to said sheet and forming a support therewith, said rubber strips being more resistant to deflection at the ends of said frame than at the other portions thereof to strengthen the sides of said support.

8. In a seat construction, a back cushion, a frame having front and rear portions defining a plane, supporting means secured to said front and rear portions and being fixed against forward or rearward movement thereby, and rubber strips secured to and extending between portions of said supporting means to form therewith a taut deflectible support in the plane defined by said front and rear portions, said rubber strips being positioned immediately in front of the lower portion of said back cushion whereby a person upon the seat is urged to maintain an upright position thereon.

9. In a seat construction, anchoring means positioned adjacent the rear of the seat, sustaining means positioned adjacent the front of the seat and defining a plane with said anchoring means, a sheet secured to said anchoring means, a second sheet secured to said sustaining means, and a plurality of rubber strips arranged in a row extending the width of the seat secured to and extending tautly between portions of said sheets to form therewith a support in the plane of said anchoring and said sustaining means, the rubber strips at the center of said seat being deflectible but more resistant to deflection than the remainder of said strips.

10. A seat comprising a back cushion, a seat cushion, a frame, and flexible supporting means secured in said frame for mounting said seat cushion, said flexible supporting means projecting under said back cushion an appreciable distance and including a plurality of rubber strips forming a part thereof to give the means resiliency, said rubber strips being positioned immediately in front of the lower end of said back cushion.

ELLWOOD F. RIESING.
ALAN E. RATHBUN.
GILBERT V. SOPER.